(12) United States Patent
Boodaei

(10) Patent No.: US 9,342,687 B2
(45) Date of Patent: May 17, 2016

(54) DETECTING SYNTHETIC KEYSTROKES

(71) Applicant: International Business Machines Corporation, Armonk, NY (US)

(72) Inventor: Mickey Boodaei, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/453,946

(22) Filed: Aug. 7, 2014

(65) Prior Publication Data

US 2016/0042175 A1   Feb. 11, 2016

(51) Int. Cl.
*G06F 21/50*   (2013.01)
*G06F 21/83*   (2013.01)
*H04L 29/06*   (2006.01)
*G06F 21/55*   (2013.01)
*G06F 3/023*   (2006.01)

(52) U.S. Cl.
CPC .............. *G06F 21/50* (2013.01); *G06F 21/83* (2013.01); *G06F 3/023* (2013.01); *G06F 21/554* (2013.01); *H04L 63/0428* (2013.01)

(58) Field of Classification Search
CPC ....... G06F 21/83; G06F 3/023; G06F 21/554; G06F 2221/033; G06F 21/50; H04L 63/0428; H04L 63/145
See application file for complete search history.

(56) References Cited

U.S. PATENT DOCUMENTS

| | | | | |
|---|---|---|---|---|
| 5,400,246 A | * | 3/1995 | Wilson | G08B 25/14 340/12.53 |
| 5,576,734 A | * | 11/1996 | Daniele | G06F 3/023 341/22 |
| 2002/0070920 A1 | * | 6/2002 | Challener et al. | 345/168 |
| 2005/0099395 A1 | * | 5/2005 | Marsden et al. | 345/168 |
| 2006/0129832 A1 | * | 6/2006 | Abedi et al. | 713/183 |
| 2009/0153488 A1 | * | 6/2009 | Suzuki | G06F 3/023 345/168 |
| 2009/0172823 A1 | * | 7/2009 | Maor | G06F 21/83 726/29 |
| 2009/0254994 A1 | * | 10/2009 | Waterson | 726/26 |
| 2009/0271866 A1 | * | 10/2009 | Liske | 726/23 |
| 2010/0058479 A1 | * | 3/2010 | Chen et al. | 726/26 |
| 2011/0320816 A1 | * | 12/2011 | Yao et al. | 713/171 |
| 2013/0007466 A1 | * | 1/2013 | Sarangdhar | G06F 21/83 713/189 |
| 2014/0096226 A1 | * | 4/2014 | Barkan | G06F 21/57 726/11 |
| 2014/0365214 A1 | * | 12/2014 | Bayley | G10L 15/26 704/235 |

OTHER PUBLICATIONS

Grebennikov, Nikolay; "Keyloggers: Implementing keyloggers in Windows. Part Two"; Securelist; Jun. 29, 2011; Printed May 5, 2014; <http://www.securelist.com/en/analysis/204792178/keyloggers?Impl . . . >.
"SetWindowsHookEx function"; Printed May 5, 2014; <http://msdn.microsoft.com/en-us/library/windows/desktop/ms644990 . . . >.

* cited by examiner

*Primary Examiner* — Don Zhao
(74) *Attorney, Agent, or Firm* — Olivia R. Scheuer; Jason H. Sosa

(57) ABSTRACT

Detecting synthetic keystrokes by maintaining a record of one or more keystrokes of physical keyboard input detected by an operating system of a computer, detecting a keystroke received at a computer application process that is executed by the computer, determining that the keystroke received at the computer application process is absent from the record of keystrokes of physical keyboard input, and identifying the keystroke received by the computer application process as being a synthetic keystroke.

20 Claims, 4 Drawing Sheets

DETECTING SYNTHETIC KEYSTROKES

BACKGROUND OF THE INVENTION

The present invention relates generally to computer security, and more particularly, to identification of keystroke events not originated by a local physical keyboard device.

SUMMARY

In one aspect of the invention a method is provided for detecting synthetic keystrokes, the method includes maintaining a record of one or more keystrokes of physical keyboard input detected by an operating system of a computer, detecting a keystroke received at a computer application process that is executed by the computer, determining that the keystroke received at the computer application process is absent from the record of keystrokes of physical keyboard input, and identifying the keystroke received by the computer application process as being a synthetic keystroke.

In other aspects of the invention, systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the present invention recognize that fraudulent use of a computer frequently involves a perpetrator remotely accessing a computer via a computer network and interacting with software that is installed on the computer. Such software may require keyboard input, which the software typically receives from the computer's operating system as keystroke events that correspond to keystrokes entered into the keyboard by a computer user. However, when a computer is controlled remotely, the attacker must synthesize such keystroke events, as the attacker does not have physical access to the computer's keyboard. Embodiments of the present invention provide techniques for tracking and comparing physical input on a keyboard to received keystrokes events by an application to detect "synthetic" events.

Figure 1:
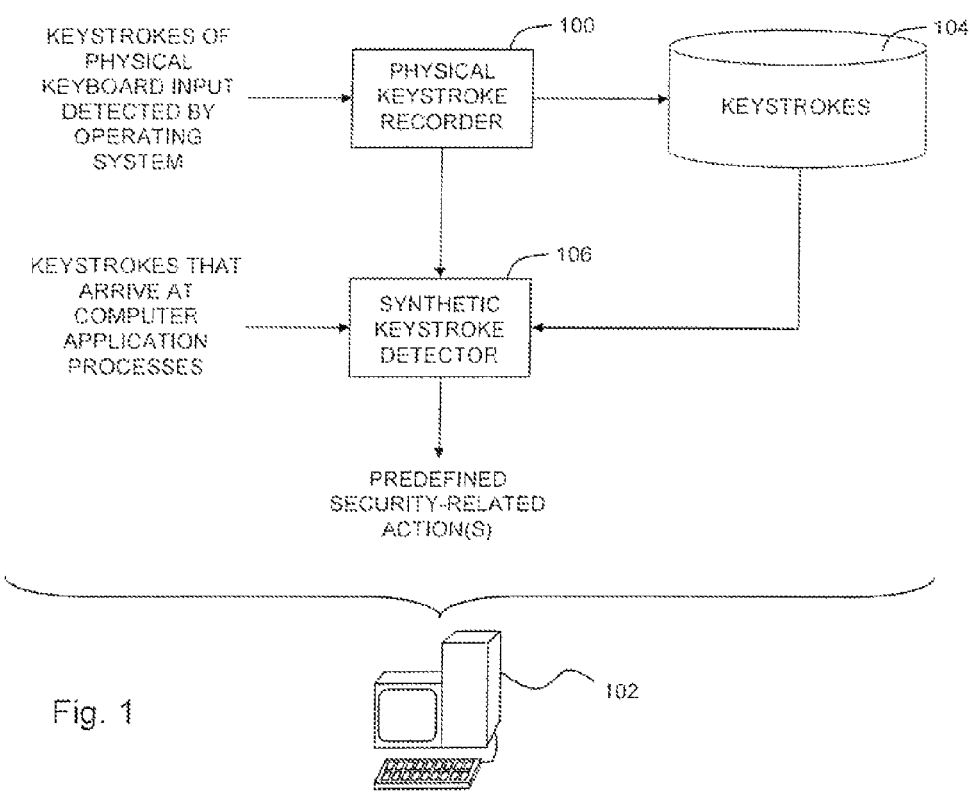
FIG. 1 is a simplified conceptual illustration of a system for detecting synthetic keystrokes, constructed and operative in accordance with an embodiment of the invention.

Reference is now made to FIG. 1 which is a simplified conceptual illustration of a system for detecting synthetic keystrokes, constructed and operative in accordance with an embodiment of the invention. In the system of FIG. 1, a physical keystroke recorder 100, such as may be hosted by a computer 102, is configured to maintain a record 104 of one or more keystrokes of physical keyboard input detected by an operating system of a computer, such as computer 102 that is operated by the Microsoft Windows® operating system that detects keystrokes as input to a computer keyboard that is in wired or wireless communication with computer 102. Physical keystroke recorder 100 is preferably configured to detect physical keyboard input substantially when the physical keyboard input is detected by the operating system of the computer. In Microsoft Windows®, this may be accomplished by any of the following methods:

- using an interrupt service routine in the kernel space of the computer memory, such as by using a kernel mode driver which hooks the keyboard interrupt (IRQ1) and which directly contacts the keyboard input/output ports (60h, 64h);
- using a kernel filter driver that intercepts keystrokes when entered via a keyboard and records them into a buffer, such as by installing a filter above the device \Device\KeyboardClass0 created by the Kbdclass driver and accessing IRP_MJ_READ requests that indicate which keyboard keys which have been pressed and released;
- using the filter driver of the i8042prt functional driver that intercepts keystrokes when entered via a non-wireless, non-USB keyboard, such as by installing a filter on top of an unnamed device created by the i8042prt driver for the Device\KeyboardClass0.

A synthetic keystroke detector 106, such as may be hosted by computer 102, is configured to detect keystrokes received at computer application processes that are executed by the computer. In Microsoft Windows® this may be accomplished by any of the following methods:

- using a keystroke interception routine in the user space of the computer memory, such as by calling SetWindowsHookEx using WH_KEYBOARD_LL or WH_KEYBOARD;
- accessing the message loop of any target application by patching or hooking calls to GetMessage/PeekMessage within the application;
- hooking the TranslateMessage (inside User32.dll) function of any target application, as this function processes incoming keystrokes;
- subclassing a keystroke-receiving window class of any target application.

Synthetic keystroke detector 106 is configured to determine whether a keystroke that is received at a computer application process is present in or absent from record 104 of keystrokes of physical keyboard input. If a keystroke that is received at a computer application process is absent from record 104, synthetic keystroke detector 106 preferably identifies the keystroke received by the computer application process as being a synthetic keystroke, and a predefined security-related action may be performed, such as notifying a computer user or a system administrator that a synthetic keystroke was detected.

Synthetic keystroke detector 106 is optionally configured to intercept keystrokes that are received at a computer application process, and to do so prior to the keystroke being processed by the computer application process, where a predefined security-related action of withholding the intercepted keystroke from the computer application process is performed if the keystroke is identified as being a synthetic keystroke.

Any of the elements shown in FIG. 1 are preferably executed by or otherwise made accessible to a computer, such as computer 102, by implementing any of the elements in computer hardware and/or in computer software embodied in a computer-readable storage medium in accordance with conventional techniques.

Figure 2:
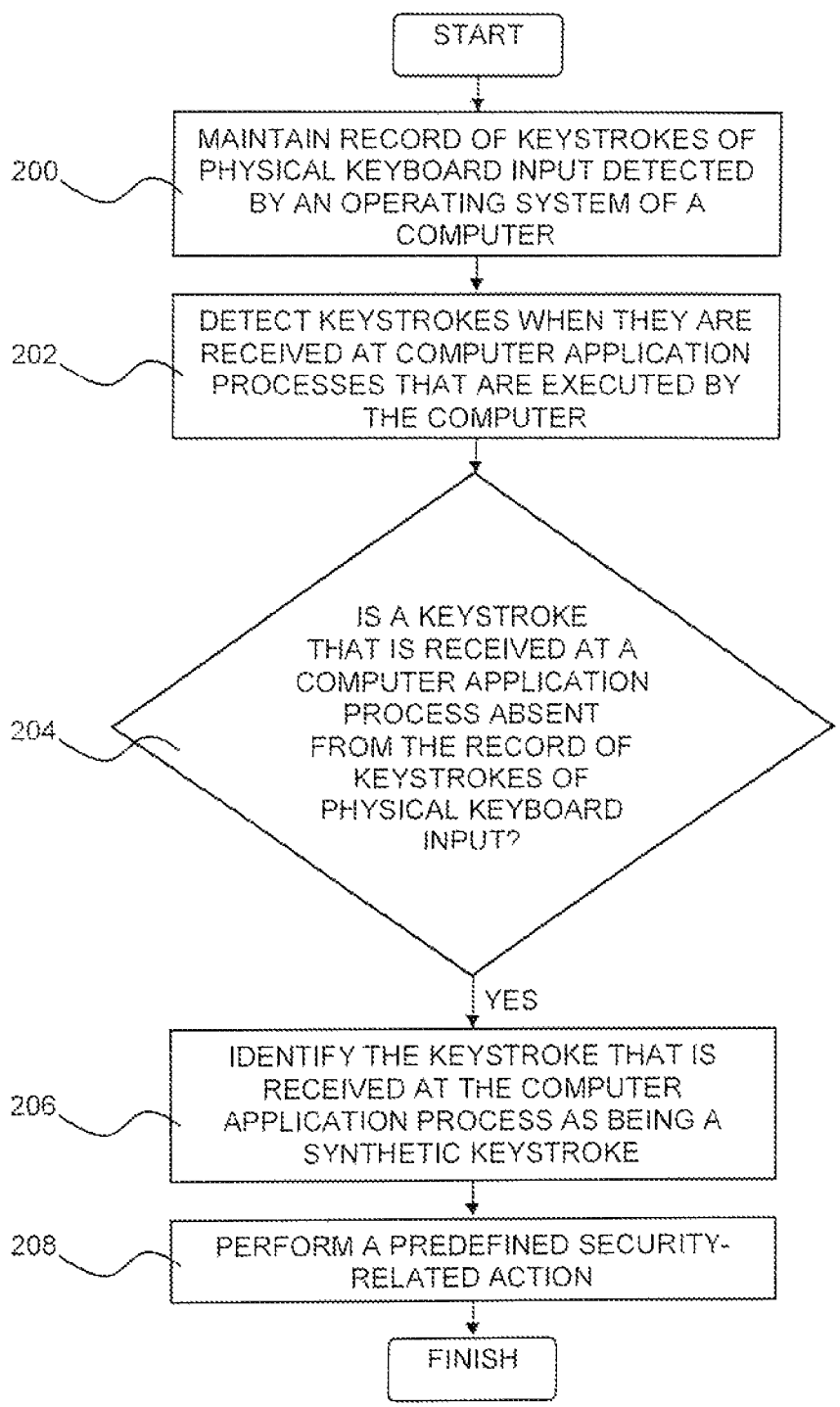
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a record is maintained of keystrokes of physical keyboard input detected by an operating system of a computer (step 200). Keystrokes are detected when they are received at computer application processes that are executed by the computer (step 202). If a keystroke that is received at a computer application process is absent from the record of keystrokes of physical keyboard input (step 204), the keystroke that is received at the computer application process is identified as being a synthetic keystroke (step 206), and one or more predefined security-related actions may be performed (step 208), such as notifying a computer user or a system administrator that a synthetic keystroke was detected.

Figure 3:
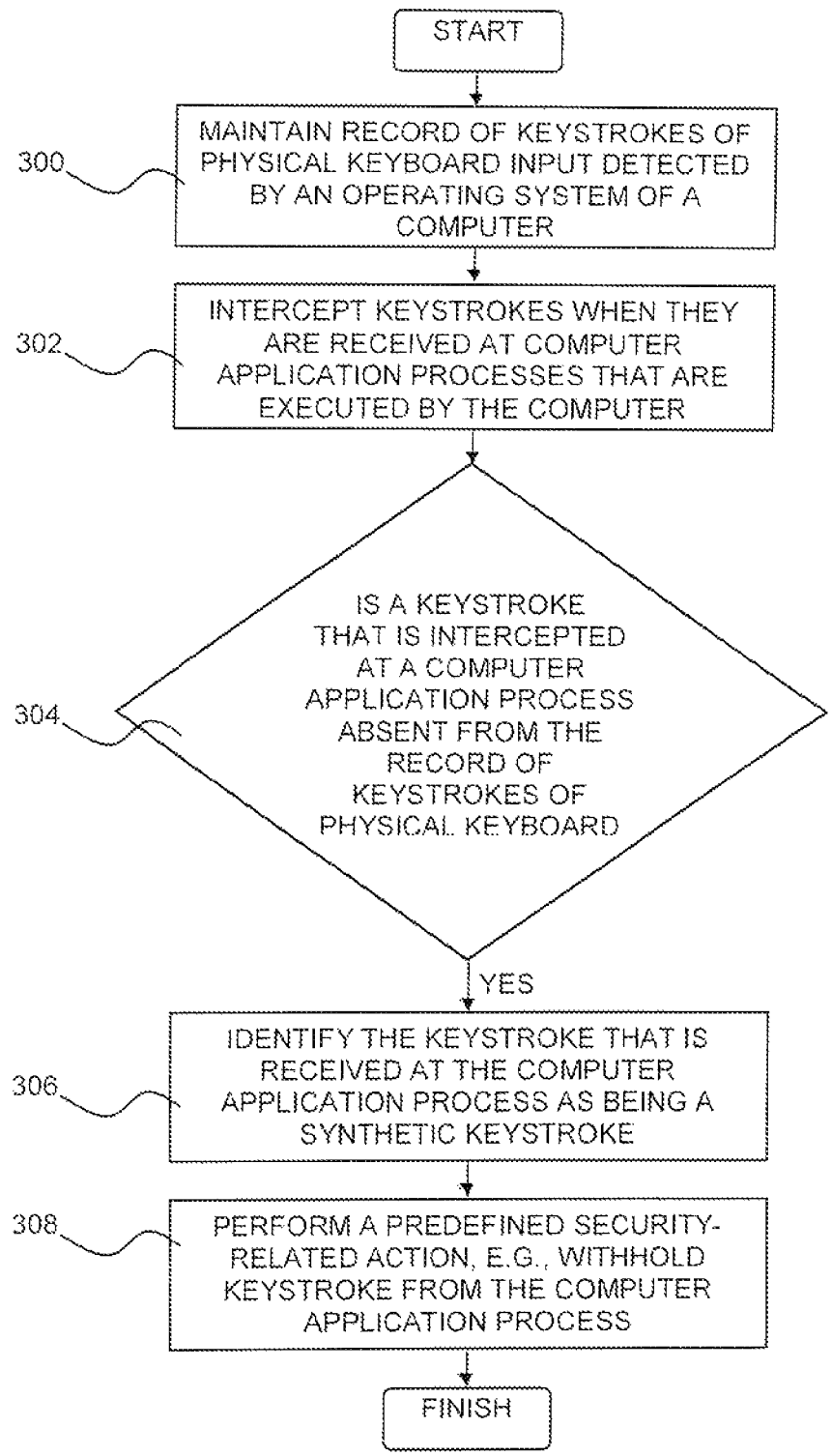
FIG. 3 is a simplified flowchart illustration of an exemplary method of operation of the system of FIG. 1, operative in accordance with an alternative embodiment of the invention.

Reference is now made to FIG. 3 which is a simplified flowchart illustration of an exemplary method of operation of the system of FIG. 1, operative in accordance with an alternative embodiment of the invention. In the method of FIG. 3, a record is maintained of keystrokes of physical keyboard input detected by an operating system of a computer (step 300). Keystrokes are intercepted as they are received at computer application processes that are executed by the computer and prior to the keystroke being processed by the computer application process (step 302). If a keystroke that is intercepted at a computer application process is absent from the record of keystrokes of physical keyboard input (step 304), the keystroke that is intercepted at the computer application process is identified as being a synthetic keystroke (step 306) and one or more predefined security-related actions may be performed (step 308), such as withholding the intercepted keystroke from the computer application process.

Figure 4:
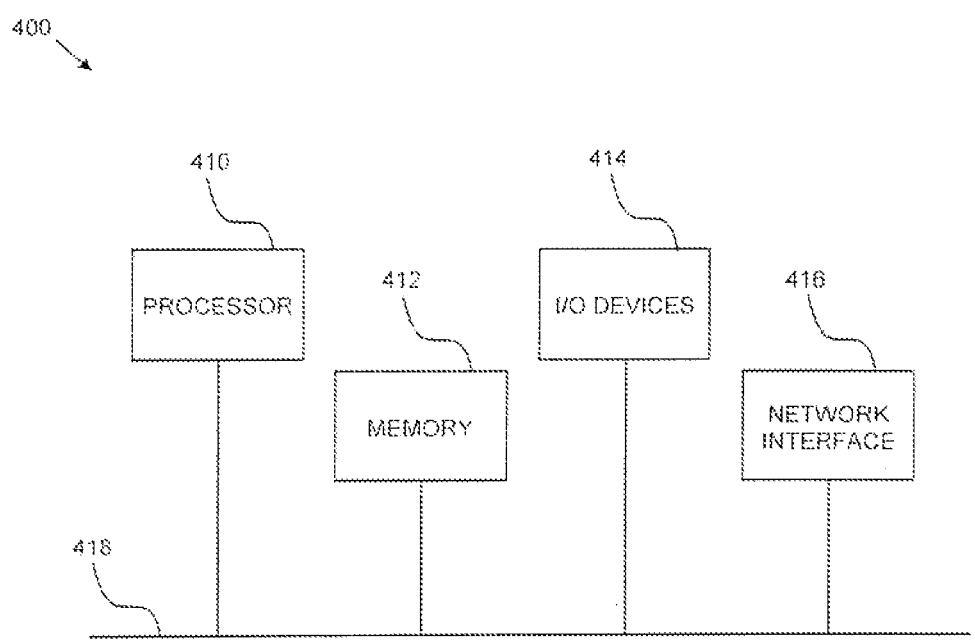
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Ruby, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting synthetic keystrokes, the method comprising:
    maintaining a record of one or more physical keystrokes of physical keyboard input detected by an operating system of a computer from a program routine in a kernel space of a computer memory of the computer that directly contacts keyboard input/output ports of the computer;
    detecting, by a synthetic keystroke detector in a user space of the computer memory, a keystroke received at a computer application process that is executed by the computer;
    comparing the record of one or more physical keystrokes of the physical keyboard input to the keystroke received at the computer application process;
    based on the comparison, determining that the keystroke received at the computer application process is absent from the record of physical keystrokes of the physical keyboard input;
    identifying the keystroke received by the computer application process as being a synthetic keystroke; and
    performing a predefined security-related action, wherein the predefined security-related action includes at (i) notifying a user of the synthetic keystroke and (ii) withholding the synthetic keystroke from the computer application process.

2. The method of claim 1, further comprising detecting the physical keyboard input substantially when the physical keyboard input is detected by the operating system of the computer.

3. The method of claim 1, further comprising detecting the physical keyboard input using a kernel filter driver.

4. The method of claim 1, further comprising detecting the physical keyboard input using an interrupt service routine in the kernel space of the computer memory that is managed by the operating system.

5. The method of claim 1, wherein detecting the keystroke received at the computer application process comprises detecting the keystroke received at the computer application process using a keystroke interception library in the user space of the computer memory that is managed by the operating system.

6. The method of claim 1, wherein detecting the keystroke received at the computer application process comprises detecting the keystroke received at the computer application process using a patch on a message loop of the computer application process.

7. The method of claim 1, wherein detecting the keystroke received at the computer application process comprises detecting the keystroke received at the computer application process by subclassing a keystroke-receiving class of the computer application process.

8. The method of claim 1, wherein detecting the keystroke received at the computer application process comprises intercepting the keystroke received at the computer application process; and
    further comprising withholding the intercepted keystroke from the computer application process.

9. A system for detecting synthetic keystrokes, the system comprising:
    one or more computer processors operatively coupled with one or more memory devices including non-transitory computer readable storage media;
    program instructions stored on the one or more non-transitory computer readable storage media being executed by at least one of the one or more processors, the program instructions comprising:

a physical keystroke recorder configured to maintain a record of one or more keystrokes of physical keyboard input detected by an operating system of a computer from a program routine in a kernel space of a computer memory of the computer that directly contacts keyboard input/output ports of the computer; and a synthetic keystroke detector configured to:
- detect, by the synthetic keystroke detector in a user space of the computer memory, a keystroke received at a computer application process that is executed by the computer,
- compare the record of one or more physical keystrokes of the physical keyboard input to the keystroke received at the computer application process,
- based on the comparison, determine that the keystroke received at the computer application process is absent from the record of physical keystrokes of the physical keyboard input,
- identify the keystroke received by the computer application process as being a synthetic keystroke, and
- perform a predefined security-related action, wherein the predefined security-related action includes (i) notifying a user of the synthetic keystroke and (ii) withholding the synthetic keystroke from the computer application process.

10. The system of claim 9, wherein the physical keystroke recorder is configured to detect the physical keyboard input substantially when the physical keyboard input is detected by the operating system of the computer.

11. The system of claim 9, wherein the physical keystroke recorder is configured to detect the physical keyboard input using a kernel filter driver.

12. The system of claim 9, wherein the physical keystroke recorder is configured to detect the physical keyboard input using an interrupt service routine in the kernel space of the computer memory that is managed by the operating system.

13. The system of claim 9, wherein the synthetic keystroke detector is configured to detect the keystroke received at the computer application process using a keystroke interception library in the user space of the computer memory that is managed by the operating system.

14. The system of claim 9, wherein the synthetic keystroke detector is configured to detect the keystroke received at the computer application process using a patch on a message loop of the computer application process.

15. The system of claim 9, wherein the synthetic keystroke detector is configured to detect the keystroke received at the computer application process by subclassing a keystroke-receiving class of the computer application process.

16. The system of claim 9, wherein the synthetic keystroke detector is configured to intercept the keystroke received at the computer application process, and withhold the intercepted keystroke from the computer application process.

17. The system of claim 9, wherein the physical keystroke recorder and the synthetic keystroke detector are implemented in any of a) computer hardware, and b) computer software embodied in the non-transitory computer readable storage media.

18. A computer program product for detecting synthetic keystrokes, the computer program product comprising:
- one or more non-transitory computer readable storage media; and
- program instructions, stored on the one or more non-transitory computer readable storage media, when executed by a hardware processor, causing the program instructions to:
- maintain a record of one or more physical keystrokes of physical keyboard input detected by an operating system of a computer from a program routine in a kernel space of a computer memory of the computer that directly contacts keyboard input/output ports of the computer,
- detect, by a synthetic keystroke detector in a user space of the computer memory, a keystroke received at a computer application process that is executed by the computer,
- compare the record of one or more physical keystrokes of the physical keyboard input to the keystroke received at the computer application process,
- based on the comparison, determine that the keystroke received at the computer application process is absent from the record of physical keystrokes of the physical keyboard input;
- to identify the keystroke received by the computer application process as being a synthetic keystroke, and
- to perform a predefined security-related action, wherein the predefined security-related action includes (i) notifying a user of the synthetic keystroke and (ii) withholding the synthetic keystroke from the computer application process.

19. The computer program product of claim 18, further comprising program instructions, stored on the one or more non-transitory computer readable storage media, to detect the physical keyboard input substantially when the physical keyboard input is detected by the operating system of the computer.

20. The computer program product of claim 18, further comprising program instructions, stored on the one or more non-transitory computer readable storage media, to:
- intercept the keystroke received at the computer application process; and
- withhold the intercepted keystroke from the computer application process in response to identifying the keystroke as being the synthetic keystroke.

* * * * *